United States Patent [19]
Krim

[11] Patent Number: 5,831,780
[45] Date of Patent: Nov. 3, 1998

[54] CONTINUALLY SUPPORTED THIN MIRROR WITH FORCE-TYPE ACTUATORS

[75] Inventor: Michael H. Krim, Trumbull, Conn.

[73] Assignee: Raytheon Company, Lexington, Mass.

[21] Appl. No.: 594,973

[22] Filed: Jan. 31, 1996

[51] Int. Cl.$^6$ ........................................ G02B 5/08
[52] U.S. Cl. .................... 359/846; 359/848; 359/872; 248/576
[58] Field of Search ...................... 359/223, 224, 359/845, 846, 847, 848, 849, 872, 571; 248/466, 575, 576, 577, 291

[56] References Cited

U.S. PATENT DOCUMENTS

| | | | |
|---|---|---|---|
| 4,295,710 | 10/1981 | Heinz | 359/849 |
| 4,408,832 | 10/1983 | Hartman et al. | 359/846 |
| 4,601,554 | 7/1986 | Plante et al. | 359/849 |
| 4,732,440 | 3/1988 | Gadhok | 359/223 |
| 5,052,793 | 10/1991 | Lapp et al. | 359/849 |
| 5,204,784 | 4/1993 | Spinhirne | 359/849 |
| 5,592,336 | 1/1997 | Saito et al. | 359/849 |

FOREIGN PATENT DOCUMENTS

| | | | |
|---|---|---|---|
| A 3119823 | 12/1982 | Germany | 359/849 |

*Primary Examiner*—Paul M. Dzierzynski
*Assistant Examiner*—John Juba, Jr.
*Attorney, Agent, or Firm*—W. C. Schubert; G. R. Lenzen, Jr.

[57] ABSTRACT

A continually supported assembly capable of being space launched includes a base and a thin optical substrate having a light collecting first surface and an opposite rear surface. An elastically coupling medium couples the rear surface of optical substrate and said base to one another. At least one force-coupled actuator is interspersed within said elastic coupling medium for controllably altering the shape of said optical substrate.

13 Claims, 3 Drawing Sheets

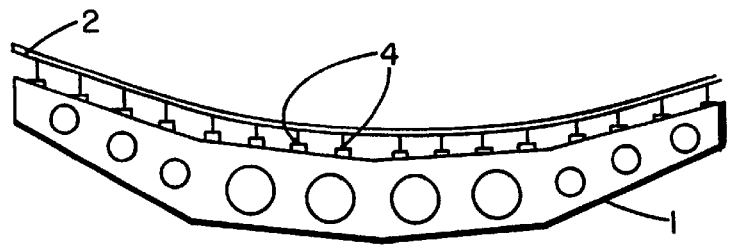
FIG. 1
(PRIOR ART)
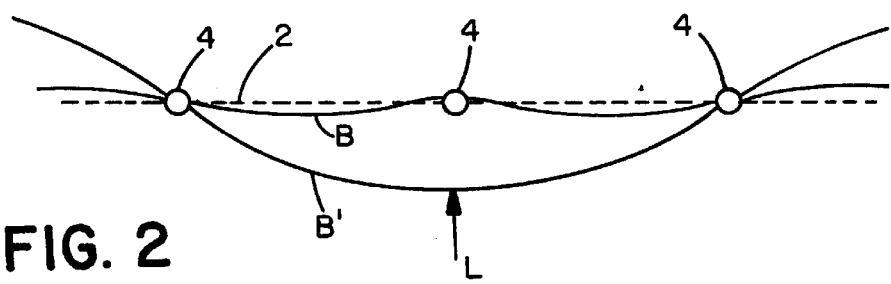
FIG. 2
(PRIOR ART)
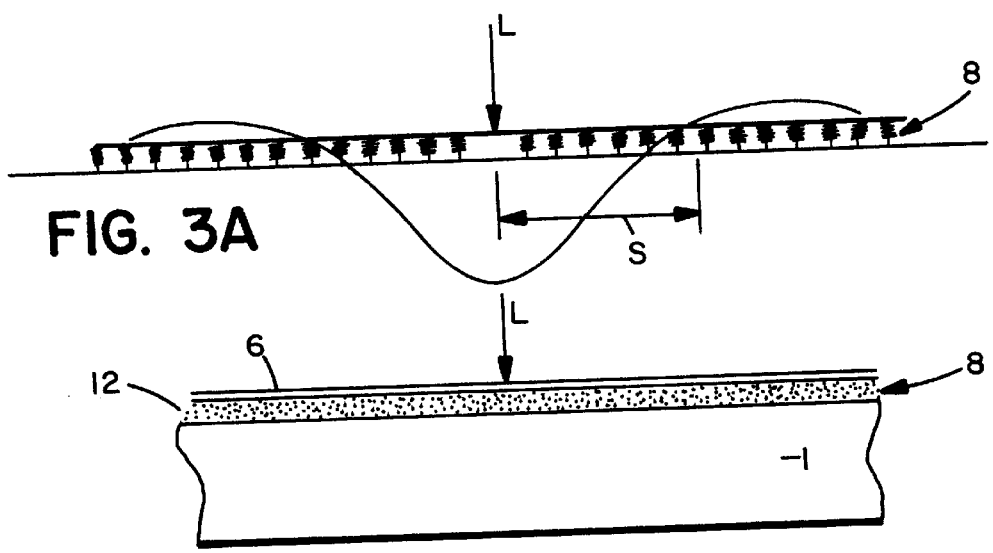
FIG. 3A
FIG. 3B
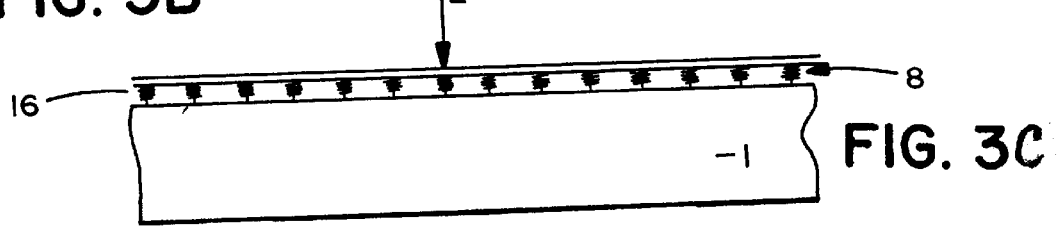
FIG. 3C

CONTINUALLY SUPPORTED THIN MIRROR WITH FORCE-TYPE ACTUATORS

BACKGROUND OF THE INVENTION

The present invention relates to continually supported thin solid mirrors primarily intended for space-based, large mirror applications where weight, reliability, schedule and cost are critical to the design.

Mirrors in such applications often have a diameter or major dimension about four meters or larger which is generally accepted as the size where shape (figure) control of the surface is required.

A variety of thin solid mirrors have been proposed for space-based applications, all of which are attached to a support or reinforcing back-up structure by an array of stiff, adjustable length devices, collectively referred to as displacement-output actuators. These devices may be likened to screw jacks in the sense that they will maintain their set position until commanded to another. The disadvantage of such non-compliant devices is that if one or more fail, the regions of the mirror under their influence may be permanently distorted leading to completely unacceptable system performance. Second, the configuring of thin mirrors and their subsequent removal from the shop mounts and installation on the flight mounts comprised of an array of stiff actuators has been proven to be a significant source of error and in some instances has prevented the completion of the figuring process.

The present invention obviates these problems, and furthermore has the specific advantages of:

1. Reduction in weight of large optical mirrors by enabling very thin, solid substrates with diameter to thickness ratios between 350 and 1000 to have equivalent launch survivability and dynamics characteristics as current designs where this ratio is usually between 10 and 20.

2. Reduction in cost of large optical mirror substrates by enabling the use of very thin solid mirrors instead of more costly 'sandwich' mirrors without sacrificing strength or dynamics performance capabilities.

3. Fail-safe or enhanced reliability by the use of soft-coupled, or force output, shape control actuators where the failure of an actuator can be compensated for by its surrounding neighbors. This is nolt realizable with stiff-coupled or displacement output actuator designs typically employed with thin mirrors.

4. The elimination and/or dramatic reduction in figure errors originating in the fabrication support system ('shop mount') or due to gravity release.

5. The reduction in the number of figure control actuators required compared to equivalent thin mirror designs where the number of displacement-type actuators is driven by either dynamics or strength requirements.

6. The ability to adjust, by design, the circle of influence of each of actuator to match the anticipated shape control requirements as opposed to the denser spacing of these active devices as driven by strength or dynamics as identified in (5).

7. Elimination of potentially catastrophic risk associated with removing a high value, figured thin mirror from the shop support system and integrating it with the flight support structure and mounting system.

In general, actuator spacing is determined by matching the amplitude and spatial frequency of the initial errors and amount of residual error that can be tolerated subsequent to correction with the displacement function produced by the actuator array. This is valid for both displacement input and force input devices.

For 'flimsy' mirrors, displacement-type or "stiff" actuators are usually employed for dynamics and strength reasons. The actuators directly couple the substrate to a stiff support structure shown in FIG. 1 so that the combined assembly has the necessary stiffness (natural frequency) and strength characteristics required for launch survival and boost phase and operational dynamics.

As shown in FIG. 1, a thin mirror is attached to stiff support structure through position-type actuators 4 to achieve requisite dynamics characteristics can have potentially fatal performance degradation if one or more actuators fail. The resiliently coupled design, which is the subject of this patent application, enables the use of forceoutput actuators and thereby eliminates this problem.

Additionally, with displacement-type actuators, the interactuator residual error will be a function of actuator spacing and the amplitude of the correction to be applied. For a uniformly curved slender bar, the attenuation factor is about 12:1 based on peak amplitudes as illustrated in FIG. 2. This ratio is based on the difference between the deflection shapes whose peak amplitudes are identical and are produced by a uniform bending moment (constant over-the-length thermal gradient B) or a single concentrated load L (non-uniform moment B'). This approach can lead to arrays of very many actuators and a consequently complex control system.

As an example, suppose a 3° F. axial gradient existed in a solid 0.9" thick ULE mirror and suppose the residual wavefront error for this specific, one of many, error contributors needed to be limited to 0.005 waves rms, or 0.0025 waves rms in surface space. That would be approximately equal to 0.01 waves peak-to-peak, or 0.25 micro-inch. Based on the 12:1 attenuation ratio from the slender bar model, the maximum allowable uncorrected displacement would be 3 micro-inches. The actuator spacing, such that there three actuators over that length of mirror which exhibited the 4 micro-inch P-P error would be $$S=[2h\Delta+\alpha\Delta T]^{0.5}$$

where h is the mirror thickness, A is the displacement and $\alpha$ and AT are the CTE and axial temperature difference respectively. For the above parameters, the spacing 's' is 11 inches equivalent to an actuator density of one per every 121 square inches. For a 4.25 m mirror, this amounts to 186 actuators. That in turn could lead to two times as many sensing points and thus rapidly evolve into a complex controls system. The failure one or more of these actuators is uncompensatable by neighboring devices and hence performance can be unacceptably degraded. It is noted that typically, the overall primary mirror in a high performance optical telescope assembly needs to be on the order of 0.035 waves rms. This needs to be allocated between fabrication and metrology, gravity release and secondary mechanical constraints, bimetallic bending caused by the coating and other coating stresses, spatially varying temperature distributions, axial temperature gradients, spatially varying material expansivities, temporal and radiation induced instabilities, etc. Presuming that the figuring and metrology errors are on the order of 0.03, that leaves 0.018 to be allocated on an equal rss basis among the remaining nine contributors, hence the 0.005 value used in this example.

Force-type actuators provide an alternative to displacement type actuators for very thin mirrors and eliminate the above failure scenario as well as reducing the number of control points required. Until now, this was generally viewed as an unattractive or impractical option because the soft spring coupling between the mirror and the actuators mounted on the support structure offered no practical stiffening for the substrate. Electronic stiffening by adding position feedback loops around each of the actuators has been accomplished in the laboratory with very small mirrors. It represents an unnecessary complexity for large space based systems. Thus the low natural frequency and strength problems remained.

Accordingly, it is an object of the present invention to provide a continually supported thin mirror using force-type actuators as an alternative to displacement type actuators and therefore eliminate the aforementioned failure scenario and to reduce the number of control points required.

Still a further object of the invention is to provide a continually supported thin mirror which is lighter in weight and less expensive than those mirrors heretofore known.

Yet a further object of the invention is to provide a near ideal elastic foundation possessing linear elastic axial stiffness, near-zero lateral stiffness, insensitivity to long-term vacuum exposure, insensitivity to variations in operating temperature, good thermal conductivity, insensitivity to moisture absorption or disabsorption, ability to withstand mechanical loads without damage, attachability and access, and deterministic and stable mechanical and physical characteristics.

SUMMARY OF THE INVENTION

A continually supported assembly capable of being space launched comprises a base and a thin optical substrate having a light collecting first surface and an opposite rear surface. An elastically coupling medium couples the rear surface of the optical substrate and the base to one another. At least one force-coupled actuator is interspersed within the elastic coupling medium for controllably altering the shape of said optical substrate.

The invention further resides in the method of forming the assembly so that their optical substrate is never removed from a mounting system during the joining operation.

BRIEF DESCRIPTION OF THE DRAWINGS

FIG. 1 is a schematic view of a prior art mirror support.

FIG. 2 is a moment beam diagram of a force distribution in a prior art mirror.

FIG. 3a is a schematic view of the mirror assembly of the present invention with a moment diagram shown thereon.

FIG. 3b is a schematic view of one type of elastic support system used in the present invention.

FIG. 3c is a schematic view of another type of elastic support system used in the present invention.

DETAILED DESCRIPTION OF THE PREFERRED EMBODIMENT

Figure 4:
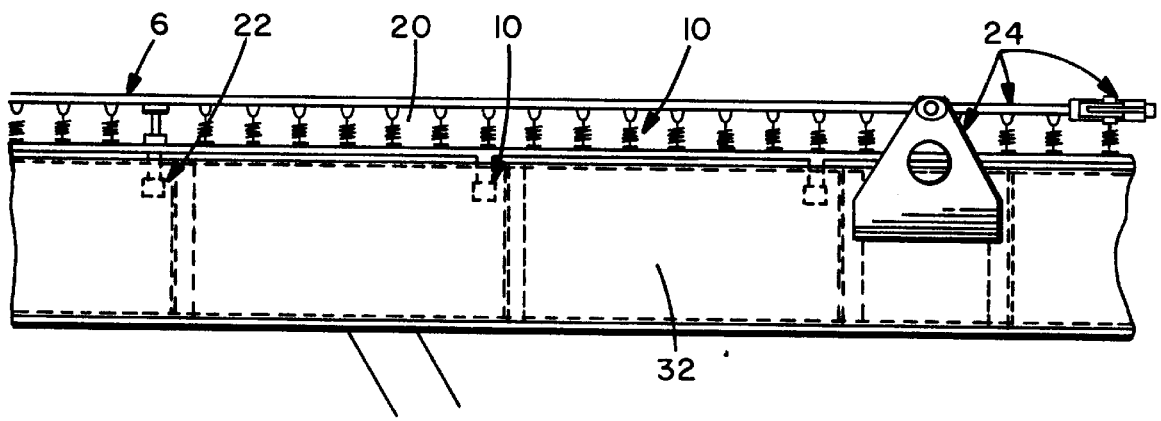
FIG. 4 is a partially fragmentary view of the mirror support system.

As illustrated in FIGS. 3a–3c, an optical substrate or mirror 6 is coupled to a support structure or base 1 through a continuous resilient foundation 8, whose stiffness is such that any unit area of the mirror has an appropriately high natural frequency. The elastic foundation includes imbedded force-type actuators 10, to provide the primary shape control function. The elastic foundation of the present invention may be embodied in one embodiment by a foam-like material 12 disposed between the base 1 and the mirror 6 as shown schematically in FIG. 3b, or in a preferred embodiment by a system of closely spaced discrete springs 16 interconnecting the base to the mirror as is shown schematically in FIG. 3c.

The equations that describe the bending of a beam on such a flexible foundation show that the deflection curve will be a sinusoid with an exponentially decaying amplitude and whose first zero crossing occurs at a distance s from the point of load application equal $$s=\pi[4EI+k]^{0.25}$$

where E and I are the flexural properties of the beam and 'k' is the foundation modulus or the spring rate per unit length.

The resilient foundation 8 also provides a means for "adjusting" the region of influence that each actuator has well as providing a means for reducing the weight of the substrate.

Figure 6:
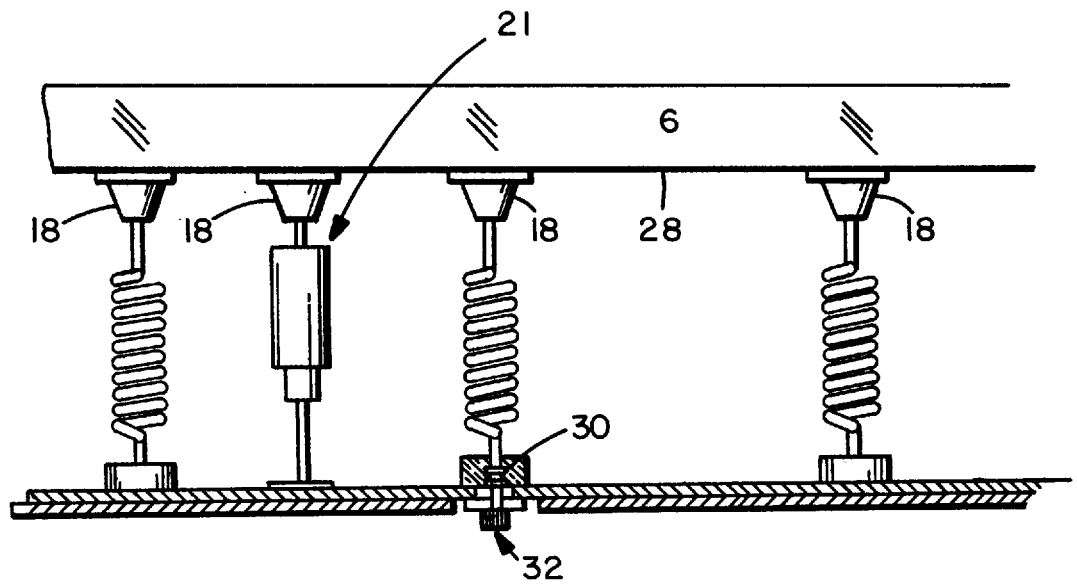
FIG. 6 is a partially fragmentary view of the mirror and panel spring connection.

The value for the foundation modulus is governed either by the desired size of the region of influence or by the desired minimum natural frequency of the mirror. In its simplest form, the natural frequency can be calculated by the familiar stiffness divided by mass relationship $$w^2=kg/W/A \text{ radians per sec}^2$$

where 'k' is the foundation modulus in (lbs/in) per square inch, 'g' is the gravitational constant and W/A is the unit weight of the mirror or the weight divided by the area. This presumes that the mirror vibrates as a rigid body on the resilient foundation or spring array and is true only for certain combinations of mirror stiffness and foundation modulus where the mirror is very stiff and the foundation extremely soft. In those cases, the same frequency can be achieved with a softer spring connection by constraining the mirror in such a way that it cannot vibrate in this simple 'pumping' mode. This may be achieved by placing the registration jacks or hardpoints at or near the nodes of the first free-free mode shape which will be higher in frequency than the simple linear mode. Use of softer coupling springs also make the mirror less sensitive to any localized deformations of the support structure. The springs may also be coated with a dampening medium or augmented with discrete dampers 21 to prevent swinging of the mirror as shown in FIG. 6.

In general however, for the range of mirror thicknesses and foundation modulii of practical application the dynamics of the mirror are largely unaffected by the presence or absence of these three constraints. While the above equation provides a good estimator of the first mode natural frequency, the mode shapes are far more complex than a simple pumping action as determined with the use a finite element model. This suggests that each unit volume of the thin mirror is more directly coupled to the support structure than to any other unit volume or that the influence coefficient matrix is very narrow banded.

To illustrate this, a resiliency of 50 lbs/in per inch squared for the foundation 8 will result in a 78 hz mounted frequency for a 1 inch thick solid ULE glass mirror using the above equation for a unit area of mirror. The computer model for the same case, with and without constraints resulted in an 81 Hz frequency, demonstrating the lack of internal coupling.

It has been found that changing the modulus for the foundation 8 or the thickness of the mirror 6 or both, provides a means for achieving a 'circle of influence' of the size desired. Hence, using a 50 lb per inch cubed foundation modulus, the zero crossing of the deflection curve based on the equation and verified with finite element modeling identified would occur approximately 44 inches away from the load point. This means that for a 1 lb load, the deflection would be 0.00017 inches or 7 waves. Thus, relatively small actuator forces would be required. Typically actuator spacings for force-type actuator arrays are at the half-zero-crossing point position or in this case, 22 inches apart. If the foundation modulus were increased from 50 to 100 lbs per inch per inch, the zero crossing point would be reduced to 39 inches. If the mirror thickness were reduced to 0.5 inches, the zero-crossing point, with k=40, would be 32 inches. Increasing k to 100 and reducing the mirror thickness to 0.5 inches produces a zero crossing of 25 inches or an actuator spacing with a capability of correcting spatial frequencies whose half period is 12.5 inches and so on.

The results below listed in Table 1 are taken from a model representing a central strip along the diameter of a 1 inch thick, 320 inch (8 m) mirror. The nodes were 4 inches apart and the foundation springs were located at each node. The designation 'N/C' below means there are no rigid constraints between the mirror and the (rigid) support structure. All the other cases have area-only bars 80 inches in from each end connecting the mirror to the support structure.

TABLE 1

| | Modeling and Analysis Results | | | |
|---|---|---|---|---|
| 'k'lb/in 3 | f1 Hz | f2 Hz | f3 Hz | RO inches |
| 1.25 N/C | 4 | 4.5 | 6.6 | — |
| 1.25 | 5.2 | 8.4 | 19 | — |
| 3.1 N/C | *20 | 21 | 22 | 98 |
| 3.1 | 21 | 2 | 28 | 98 |
| 12.5 | 41 | 43 | 46 | 70 |
| 50 | 81 | 84 | 85 | 45 |

Figure 7:
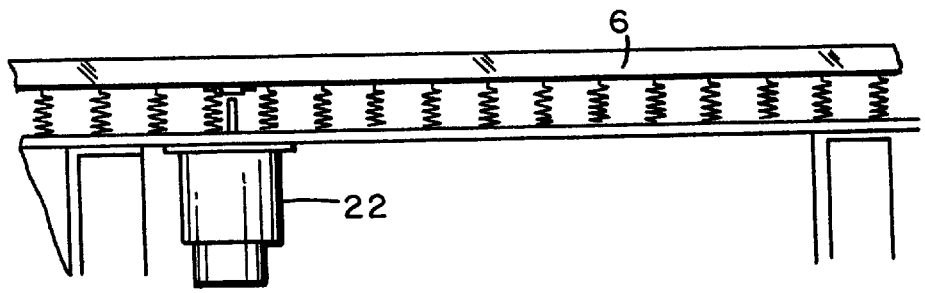
FIG. 7 is a partially fragmentary view of showing a displacement-output registration actuator.

Thus, in a mirror it is possible to provide an extraordinarily thin substrate permanently attached to a stiff support structure through a resilient interface prior to figuring and polishing. It would only be necessary to achieve an acceptable figure over instantaneous regions equal in size to an actuator "influence circle", approximately the diameter of the zero-crossing line described earlier, as in the case with a directly coupled registration actuator 22 shown in FIG. 7. Of course in such a design, spring coupled "force actuators" 10' provide the longer spatial frequency shape control as shown in FIG. 5.

Figure 5:
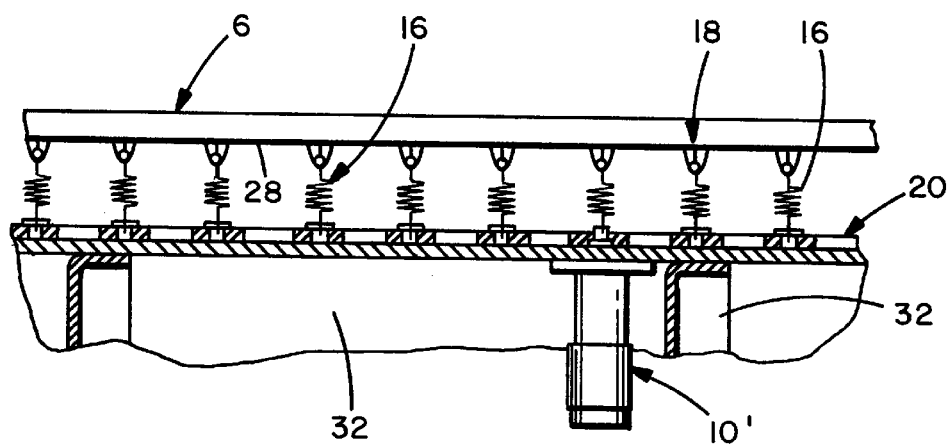
FIG. 5 is a partially fragmentary detail view of the system of FIG. 4.

Referring now to FIGS. 4 and 5, the assembly includes the mirror b comprised of a thin solid or meniscus substrate, the base 1 which provides a substrate support surface, an array of linear elastic substrate support springs 16, a plurality of radially compliant attachment fittings 18 connecting the top ends of the springs to the back surface 28 of the mirror 2, and intermediate attachment plates or panels 20 connecting the lower opposite ends of the springs 16 to the base 1. Interspersed within the array of springs 16 are three displacement-output registration actuators 22 and the force output mirror shape control actuators 10 which are secured to associated ones of the attachment panels 20 by known means, such as bolting. The displacement actuators 22 provide reference coordinates against which the force-type actuators act. A lateral mirror attachment fitting 24 is also provided as is standard in the industry. Also, it should be understood that the springs 16 may be either coil springs or leaf springs.

As illustrated in FIG. 6 the coil springs are fitted at the top end thereof with the fittings 18 which are welded-on, radially compliant cups at one end thereof and with threaded studs 30 at the other opposite ends. The cups 18 provide a means to bond the spring to the rear surface 28 of the mirror while accommodating expansion differences between the cup and the mirror itself. Each threaded stud. end 30 connects to a panel 20 using an Allen headed cap screw 34 and the panel in turn is connected to a box beam 32 which makes up part of the base 1. The panels facilitate assembly operations by eliminating the need to "thread" hundreds of the spring ends through attachment holes in the entire support structure simultaneously. Secondly, these local panels eliminate the need to perforate the load carrying structure 14 which in general is to be avoided if possible.

Figure 8:
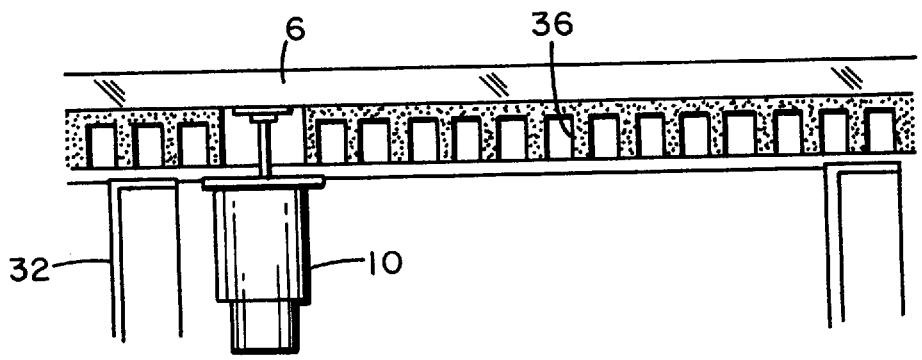
FIG. 8 is an alternative embodiment of the elastic support system.

Referring now to FIG. 8, it should be seen that the resilient foundation 8 may alternatively take the form of a resilient foam interface 12 which is bonded between the back surface 28 of the mirror 6 and the panels 20. The interface has a waffle-like grid relief 36 to provide a means for achieving control over the compressive (axial) and shear (lateral) stiffness characteristics.

The assembly of the support system begins after the mirror is coarse figured on a "hard" shop support and is ready for small-tool, loose abrasive figuring and polishing. Thereafter the a following primary steps occur:

a) The mirror 6 is placed in a face-down position on a matching curvature form tool provided with a compliant interface.

b) Each of the spring 16 assemblies through its associated cup 18 is individually bonded to the substrate at the rear surface 28 using a positioning tooling jig. During this operation the attachment cups 18 for the shape control actuators 10 and the position registration actuators 22 are also attached.

c) The joiner panels 20 are next positioned over a group of actuators 10, 22 and fastened with the nuts and washers.

d) Removable spacers are next installed between the rear surface 28 of the mirror and the joiner panels 20 to enable a moderate clamping force to be established for the subsequent box beam to joiner panel bonding operation.

e) The box beam 32 is positioned over the inverted mirror and lowered by jacks until contact is made with the joiner plates 20 to which have been applied on the opposing surface an epoxy resin (or equivalent) with imbedded bond-line thickness control wires.

g) The shape control actuators 10 and the three position registration actuators 22 are next connected to the stud ends 30 of the springs 16. Access for this operation is from the rear of the panels through openings in the box-beam structure.

h) Figuring and polishing is then completed utilizing small tools to achieve short spatial frequency precision and the shape control actuators 10 to achieve the long spatial frequency figure quality.

i) The mirror is then coated. To accomplish this, the assembly is sealed, except for the exposed optical surface in a protective envelope to prevent any contaminants in the structure from degrading the coating. The enclosure may require cooling air to be passed through it depending on the temperature and dwell times involved in the coating process.

An important feature of the above process is that the mirror is never removed from the mounting system during the joining operation. Gravity release will cause the mirror to "lift away' from the support structure. For a 0.9 inch thick mirror, this lifting would be between one to two thousandths of an inch. For a 50 lb./inch per square inch foundation modulus, this would put a nominally 175 lb. load on each of the three positioning jacks. The reference positioning actuators 22 are adjusted enable them to achieve in the mirror a zero-load position, and thus return the mirror to its equilibrium, as-fabricated state.

Accordingly, the invention has been described by way of illustration and not limitation.

What is claimed is:

1. A continually supported assembly comprising:
   a base;
   a thin optical substrate having a light collecting first surface and an opposite rear surface;
   means for elastically coupling said rear surface of said optical substrate and said base to one another; and
   at least one force-coupled actuator interspersed within said elastic coupling means and connected between said base and said optical substrate for controllably altering the shape of said optical substrate, and said elastic coupling means includes a resilient foundation which contains only in part said at least one force-coupled actuator.

2. An assembly as defined in claim 1 further characterized in that said elastic coupling means includes a plurality of springs arranged in an array.

3. An assembly as defined in claim 2 further characterized in that said springs are coil springs having first ends associated with said rear surface and second ends associated with said base.

4. An assembly as defined in claim 3 further characterized in that said first ends of said coil springs connect to said rear surface through bonded radially compliant cups.

5. An assembly as defined in claim 4 further characterized in that said elastic coupling means includes a resilient foam interface which is bonded between the surface of the optical substrate and the base.

6. An assembly as defined in claim 4 further characterized in that each of said coil spring second ends has a threaded stud which connects to a panel secured to said base.

7. An assembly as defined in claim 6 further characterized in that said assembly includes at least one displacement output actuator connected directly to said rear surface.

8. An assembly as defined in claim 7 further characterized in that said at least one force-coupled actuator connects between said base and said rear surface through one of said plurality of springs.

9. An assembly as defined in claim 8 further characterized in that said assembly is made by placing the mirror face-down on a matching curvature form tool provided with a compliant interface;
   bonding each of the spring assemblies through its associated cup to the rear surface using a positioning tooling jig;
   positioning the joiner panels over associated ones of said actuators and fastening thereto; and
   installing removable spacers between the rear surface of the mirror and the joiner panels to enable a moderate clamping force to be established.

10. An assembly as defined in claim 9 further characterized in that said assembly is further made by positioning a box beam over the inverted mirror and lowering the beam until contact is made with the joiner plates to which have been applied an epoxy resin using imbedded bond-line thickness control wires;
    connecting the shape control actuators and the three position registration actuators to the stud ends of the springs; and figuring and polishing the light collecting surface of the optical substrate.

11. A continually supported assembly comprising:
    a base;
    a thin optical substrate having a light collecting first surface and an opposite rear surface;
    means for elastically coupling said rear surface of said optical substrate and said base to one another;
    at least one force-coupled actuator interspersed within said elastic coupling means and connected between said base and said optical substrate for controllably altering the shape of said optical substrate;
    said elastic coupling means including a plurality of springs arranged in an array;
    said springs being coil springs having first ends associated with said rear surface and second ends associated with said base;
    said first ends of said coil springs connecting to said rear surface through bonded radially compliant cups;
    each of said coil spring second ends having a threaded stud which connects to a panel secured to said base;
    said assembly including at least one displacement output actuator connected directly to said rear surface;
    said at least one force-coupled actuator connecting between said base and said rear surface through one of said plurality of springs; and wherein
    said assembly is made by placing the optical substrate face-down on a matching curvature form tool provided with a compliant interface;
    bonding each of the spring assemblies through its associated cup to the rear surface using a positioning tooling jig;
    positioning the joiner panels over associated ones of said actuators and fastening thereto; and
    installing removable spacers between the rear surface of the mirror and the joiner panels to enable a moderate clamping force to be established.

12. A continually supported assembly comprising:
    a base;
    a thin optical substrate having a light collecting first surface and an opposite rear surface;
    means for elastically coupl ing said rear surface of said optical substrate and s ai d base to one another;
    at least one force-coupled actuator interspersed within said elastic coupling means and connected between said base and said optical substrate for controllably altering the shape of said optical substrate;
    said elastic coupling means including a plurality of springs arranged in an array;
    said springs being coil springs having first ends associated with said rear surface and second ends associated with said base;
    said first ends of said coil springs connecting to said rear surface through bonded radially compliant cups; and
    said elastic coupling means including a resilient foam interface which is bonded between the surface of the optical substrate and the base.

13. A continually supported assembly comprising:
    a base;
    a thin optical substrate having a light collecting first surface and an opposite rear surface;

means for elastically coupling said rear surface of said optical substrate and said base to one another;

at least one force-coupled actuator interspersed within said elastic coupling means and connected between said base and said optical substrate for controllably altering the shape of said optical substrate;

said elastic coupling means including a plurality of springs arranged in an array;

said springs being coil springs having first ends associated with said rear surface and second ends associated with said base;

said first ends of said coil springs connecting to said rear surface through bonded radially compliant cups; and each of said coil spring second ends having a threaded stud which connects to a panel secured to said base.

* * * * *